United States Patent [19]
Stroud

[11] Patent Number: 5,544,846
[45] Date of Patent: Aug. 13, 1996

[54] PARACHUTE DEPLOYMENT SYSTEM

[76] Inventor: Robert W. Stroud, 9000 E. Memorial, Jones, Okla. 73049

[21] Appl. No.: 541,809

[22] Filed: Oct. 10, 1995

Related U.S. Application Data

[63] Continuation of Ser. No. 303,637, Sep. 9, 1994, abandoned.

[51] Int. Cl.⁶ .................... B64D 17/64; B64D 17/50; B64D 17/52; B64D 17/40
[52] U.S. Cl. .................... 244/147; 244/148; 244/149; 244/151 B
[58] Field of Search ............... 244/137.3, 147, 244/148, 149, 142, 143, 151 A, 151 B, 152

[56] References Cited

U.S. PATENT DOCUMENTS

| | | | |
|---|---|---|---|
| 1,332,143 | 2/1920 | Osterday | 244/147 |
| 1,478,677 | 12/1923 | Rogers | 244/147 |
| 1,532,588 | 4/1925 | Heinecke | 244/147 |
| 1,901,380 | 3/1933 | Salone et al. | 244/148 |
| 2,196,947 | 4/1940 | Swofford | 244/142 |
| 2,468,130 | 4/1949 | Stallworth | 244/148 |
| 3,830,453 | 8/1974 | Cannarozzo | 244/148 |
| 3,926,391 | 12/1975 | Nordine | 244/149 |
| 4,637,577 | 1/1987 | Miseyko et al. | 244/147 |
| 4,923,150 | 5/1990 | Calkins et al. | 244/151 B |
| 5,024,400 | 6/1991 | Cloth | 244/147 |
| 5,232,184 | 8/1993 | Reuter | 244/149 |
| 5,253,826 | 10/1993 | Coltman et al. | 244/149 |
| 5,388,786 | 2/1995 | Hirose | 244/138 R |

FOREIGN PATENT DOCUMENTS

| | | | |
|---|---|---|---|
| 832968 | 10/1938 | France | 244/142 |
| 1216206 | 4/1960 | France | 244/147 |
| 819696 | 9/1959 | United Kingdom | 244/149 |

Primary Examiner—Andres Kashnikow
Assistant Examiner—Virna Lissi Mojica
Attorney, Agent, or Firm—Craig W. Roddy

[57] ABSTRACT

A parachute deployment system having a pack with an attached parachute and a detachably coupled handle. The handle is used to activate the deployment system by physically opening the pack via an internal rip cord pin in communication therewith. Further, the handle is used to pull a pilot bag, which holds the parachute, from the pack and into the air stream. The pilot bag provides sufficient drag for effectively deploying the parachute therefrom.

18 Claims, 4 Drawing Sheets

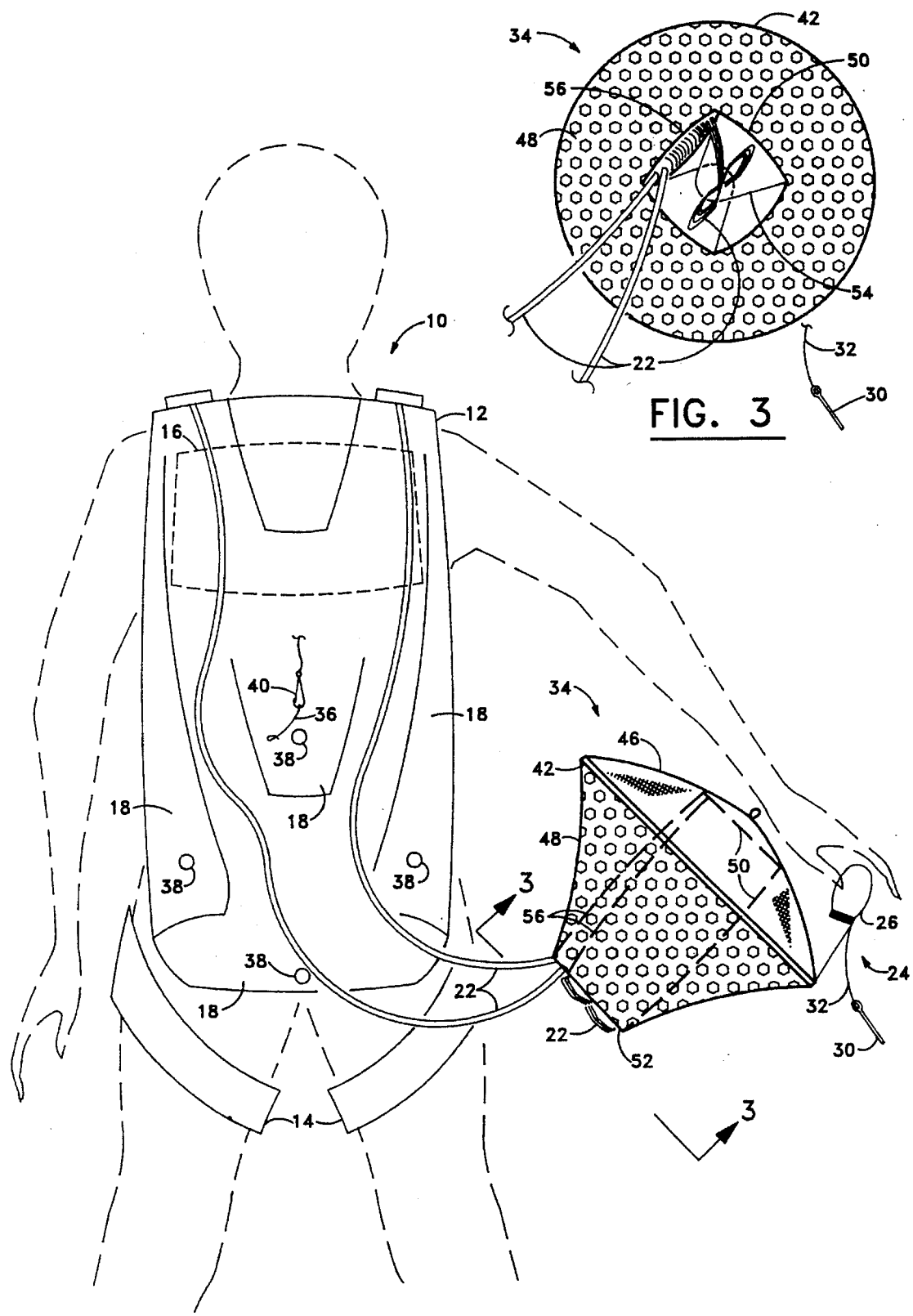
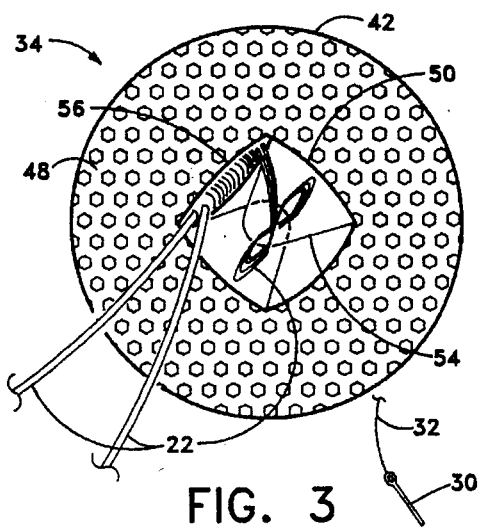
FIG. 3
FIG. 2

PARACHUTE DEPLOYMENT SYSTEM

This is a continuation of application Ser. No. 08/303,637 filed on Sep. 9, 1999, now abandoned.

BACKGROUND

The present invention relates generally to a parachute deployment system, and more particularly to a deployment system having an internal rip cord pin and an assisting means such as a pilot bag or the like.

Parachute deployment systems are commonly known and used in the art. A conventional system includes a pack which is harnessed to a jumper's body and contains a main chute. Deployment systems typically use a pilot chute which is physically or mechanically pulled away from the jumper's body and allowed to drag in the air stream during free fall. As the pilot chute is deployed, a bridle connected thereto is pulled away from the pack to release an external rip cord pin in communication therewith. Thus, the pilot chute and bridle are used to open the pack and draw the main chute therefrom.

Known parachutes deployment systems have many disadvantages. The main chute is not released from the pack unless the pilot chute is properly deployed. Further, the external rip cord pin can prematurely dislodge which causes the main chute to release before the pilot chute, thereby creating a "horseshoe" malfunction.

Because known parachute deployment systems rely upon a deployed pilot chute for opening the pack and releasing the parachute, it is desirable to have a deployment system in which the Jumper physically opens the pack and pulls the assisting means and parachute into the air stream. For the foregoing reasons there is a need for a simple, economical and effective parachute deployment system in which the Jumper opens the pack and pulls the assisting means and parachute therefrom; however, until now, no such system has been developed.

SUMMARY

The embodiment of the invention is directed to a system for satisfying the need of providing a parachute deployment system in which the jumper initially opens the pack and pulls a parachute and assisting means, such as a pilot bag or the like, therefrom.

When prior art parachute deployment systems are used, the pilot chute and bridle are initially deployed and relied upon to open the pack and draw a deployment bag and main chute therefrom. However, the preferred embodiment of the present invention has an initiating means, such as a handle or the like, which is used to open the pack and to pull the parachute and assisting means into the air stream. Thus, the conventional pilot chute and bridle are eliminated from the present embodiment of the invention.

The preferred version of the invention relates particularly to a parachute deployment system for direct deployment of a personal parachute, such as a sport main canopy, during free fall. More specifically, the system comprises: a pack which is held on a jumper's body by a harness; a parachute attached to the pack via lines; an assisting means, such as a pilot bag or the like, which holds the parachute and increases drag for deployment of the parachute therefrom; and an initiating means, such as a handle, which is connected to both the pilot bag and an internal rip cord pin. Thus, the handle is used to open the pack, by means of the internal rip cord pin, and to pull the parachute and pilot bag from the pack.

As such, it is a first object of the embodiment of the invention to provide an assisting means, such as a pilot bag or the like, for use in deploying a parachute.

It is a further object of the embodiment of the invention to provide a parachute deployment system having a pilot bag that substantially contains the parachute and increases drag for effectively deploying the parachute therefrom.

It is a further object of the embodiment of the invention to provide a parachute deployment system which has an invertible pilot bag for reducing drag after the parachute is opened.

It is a further object of the embodiment of the invention to provide a parachute deployment system having an internal rip cord pin.

It is a further object of the embodiment of the invention to provide a parachute deployment system which provides direct and simultaneous removal of both the parachute and assisting means from the pack.

It is a further object of the embodiment of the invention to provide a parachute deployment system which prevents common malfunctions, such as "pilot chute in-tow" and "horseshoe" malfunctions.

It is a further object of the embodiment of the invention to provide a parachute deployment system which prevents canopy entanglement when one Jumper is stacking next to another Jumper.

It is a further object of the embodiment of the invention to provide a parachute deployment system which eliminates the need for a pilot chute and bridle.

It is a final object of the embodiment of the invention to provide a parachute deployment system which is easier, safer and more reliable to use than conventional parachute deployment systems.

BRIEF DESCRIPTION OF THE DRAWINGS

These and other features, aspects, and advantages of the present invention will become better understood with regard to the following description, appended claims, and accompanying drawings where:

FIG. 2 is a back elevation view of the deployment system shown in FIG. 1, wherein the pack has been opened and the pilot bag and parachute are being pulled therefrom;

FIG. 3 is a view of the pilot bag taken along line 3—3 of FIG. 2;

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

The present embodiment of the invention is not intended to be limited to only those items illustrated herein, but rather, includes omitted deployment system items which are known in the art and are not necessary for understanding the present invention. Therefore, the figures have been simplified to eliminate known components, such as grommets, flaps, tabs, line stows, cover flaps and rubber bands or stow loops, which are associated with the present embodiment of the invention known as a parachute deployment system 10.

Figure 1:
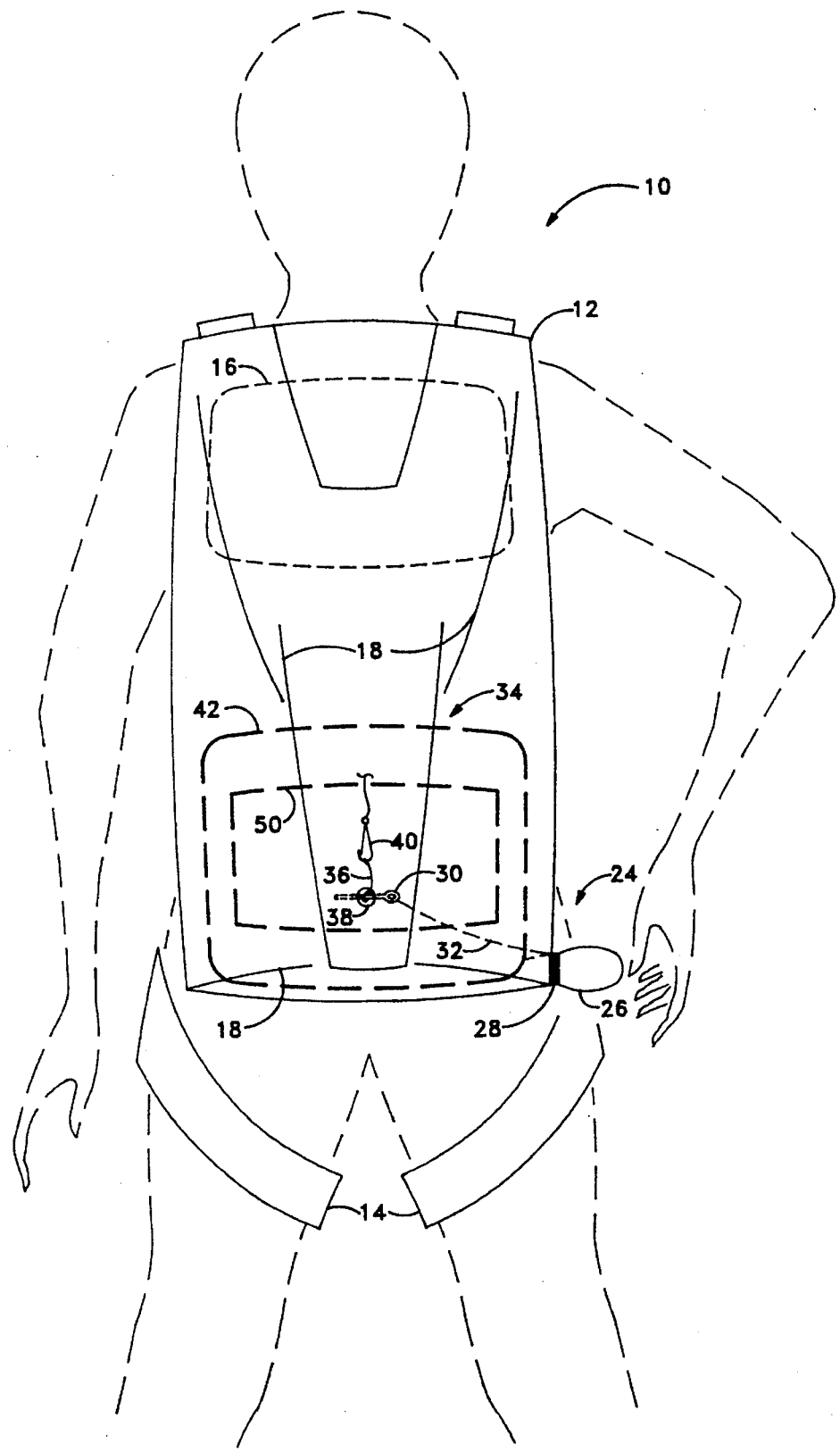
FIG. 1 is a back elevation view of the parachute deployment system constructed in accordance with the present embodiment of the invention, wherein the pilot bag and parachute are stowed in the pack.

As best illustrated in FIG. 1, the preferred version of the parachute deployment system 10 includes a pack 12 which attaches to the back of a Jumper by means of a harness 14. The pack 12 is similar to those commonly known in the art, such as a tandem parachute assembly which includes a known reserve chute assembly 16. A plurality of pack flaps 18 are provided to enclose the pack 12. In addition, the harness 14 includes an arrangement of webbing that is fashioned to conform to the Jumper's body or other load being carried, wherein the weight of the Jumper's body or load is evenly distributed during use of the deployment system 10.

Figure 4:
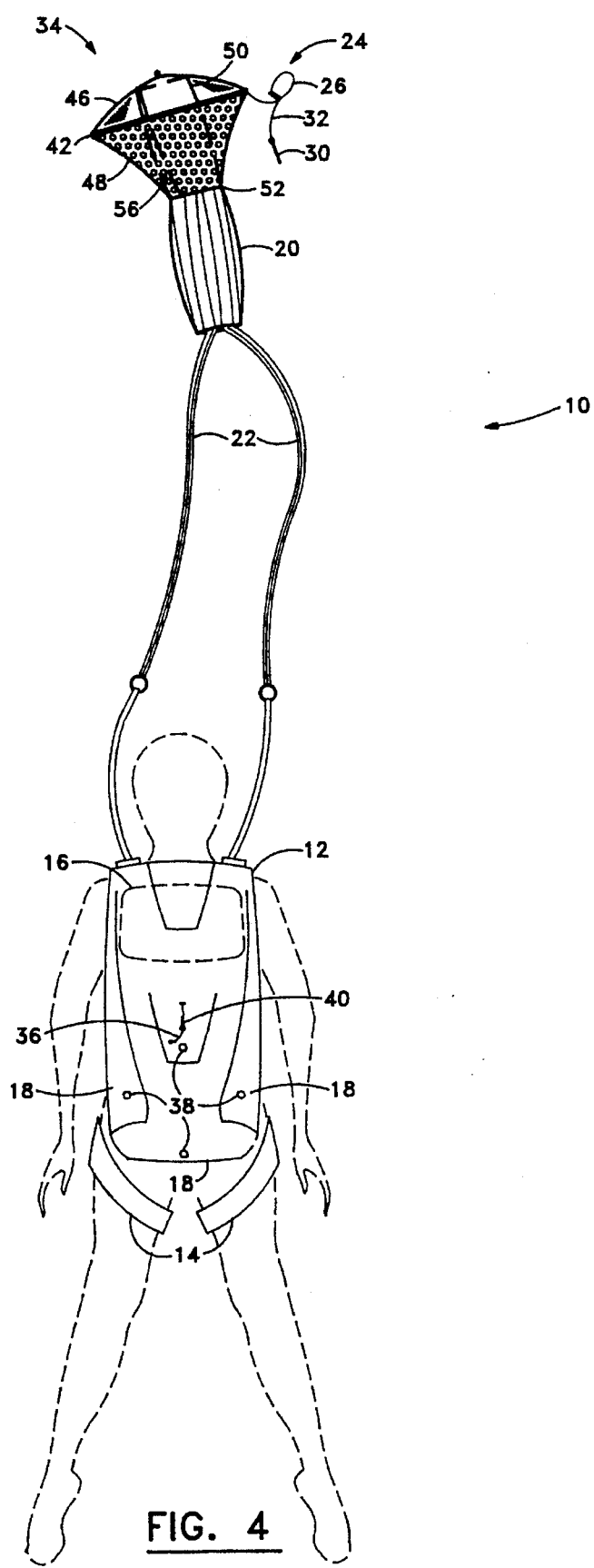
FIG. 4 is a back elevation view of the deployment system shown in FIG. 2, wherein the pilot bag is drawn away from the pack and the parachute is being released therefrom.
Figures 5, 6:
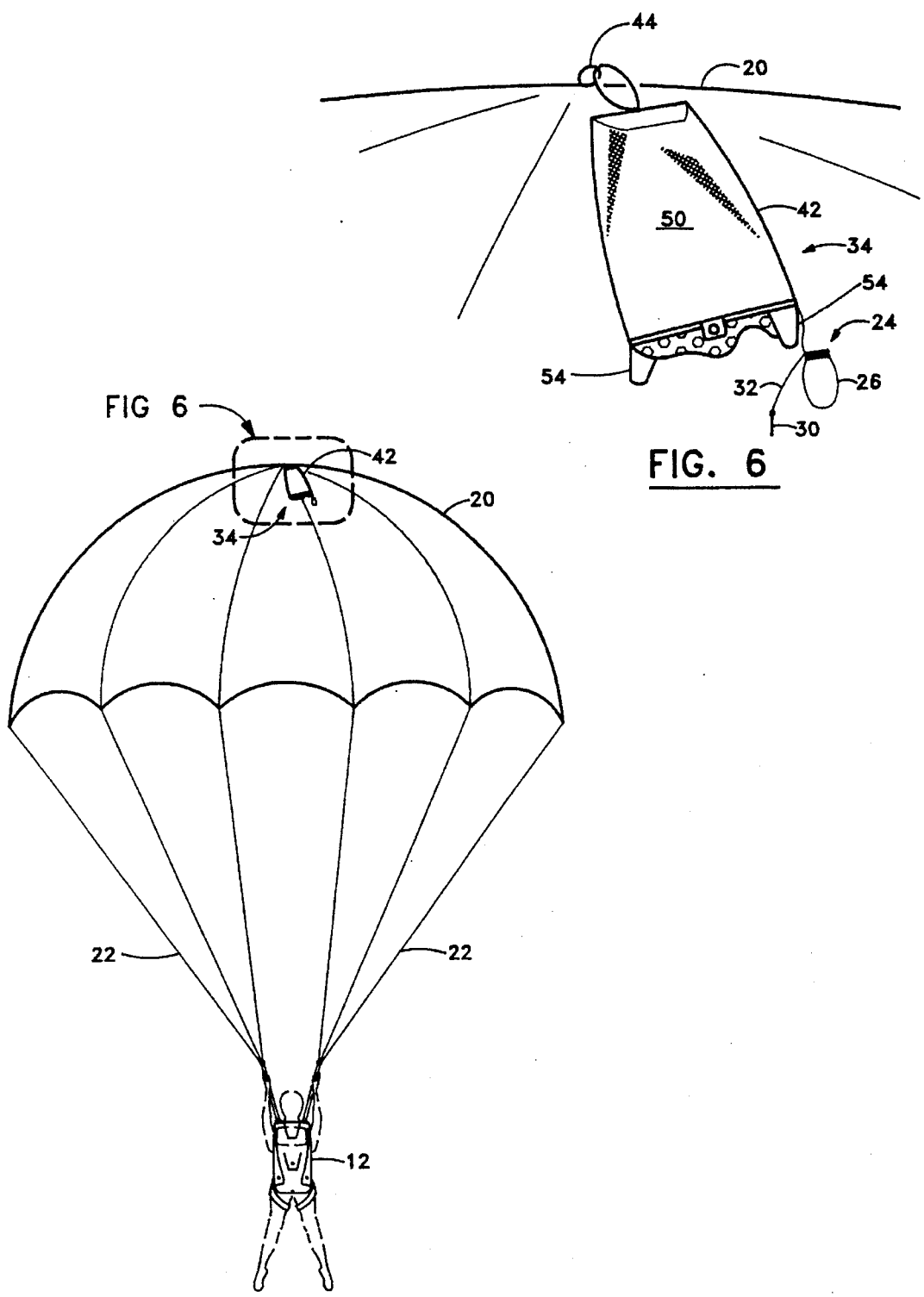
FIG. 5 is a back elevation view of the deployment system shown in FIG. 4, wherein the parachute is fully deployed.
FIG. 6 is an enlarged view of the inverted pilot bag shown in FIG. 5.

As best illustrated in FIGS. 2, 4 and 5, the system 10 is useful in deploying a parachute 20. The parachute 20 includes any canopy made of a pliant sheet-like material, such as nylon fabric, wherein the parachute 20 serves as a retardation device for objects moving through air. The deployed parachute 20 may be umbrella-shaped, wing-shaped or any other suitable configuration.

The parachute 20 is attached to the pack 12 using lines 22 which are sometimes referred to in the art as shroud lines. The lines 22 are secured to the pack 12 and parachute 20 using conventional means of attachment.

As shown in FIGS. 1 and 2, an initiating means 24 is provided for activating the deployment system 10. The initiating means 24 in the present embodiment includes a handle 26 which is accessible to the jumper. Preferably, the handle 26 is made of a durable and pliant fabric, such as nylon, and is filled with a padding material, whereby the handle 26 is easily grasped by the jumper's hand. It is obvious that numerous materials and configurations may be used to produce the handle 26.

A coupling means 28 is provided for detachably coupling the handle 26 with the pack 12. The preferred coupling means 28 is "VELCRO" although other detachable coupling means 28, such as a snap or slide tab means, may be suitable.

As shown in FIGS. 1 and 2, the handle 26 is preferably connected to an internal rip cord pin 30 or other suitable closure means, wherein a strap 32 made of nylon or other acceptable materials is stitched or similarly adapted for connecting the handle 26 to the rip cord pin 30. Further, the handle 26 is either directly stitched to an assisting means 34, which is further described herein, or adjacently connected thereto (as shown in FIG. 2) using a piece of strap material, wherein the strap material is similar to that utilized in attaching the handle 26 to the rip cord pin 30.

The rip cord pin 30 is located inside the pack 12 between the assisting means 34 and adjacent the most internal pack flap 18. When the parachute 20 is stowed inside the pack 12, the rip cord pin 30 is received through a looped portion of rip cord 36, wherein the rip cord 36 is received through an aperture 38 on each pack flap 18.

The rip cord 36 is tied to a fastener 40, wherein the fastener 40 is located adjacent the aperture 38 of the most external pack flap 18 and is connected to the pack 12 using "VELCRO" or other suitable means. The rip cord 36 holds the pack flaps 18 closed to retain the parachute 20, lines 22 and assisting means 34 within the pack 12. Wherefore, the pack 12 remains closed until the handle 26 is pulled therefrom to release the rip cord pin 30 from the rip cord 36 which in turn releases the pack flaps 18 to open the pack 12. While the preferred embodiment of the invention utilizes an internal rip cord pin 30, it is obvious to use a conventional external rip cord system with the deployment system 10.

As shown in FIG. 2, after the pack 12 is opened, the Jumper uses the handle 26 to continue pulling the assisting means 34 and parachute 20 from the pack 12 and into the air stream. The assisting means 34, such as a pilot bag 42 or the like, preferably contains the parachute 20 during stowage and release from the pack 12. The pilot bag 42 is attached to the parachute 20 using a looped tie 44 with movement, such as that commonly utilized in the art for attaching a deployment bag to a parachute, see FIG. 6.

As illustrated in FIGS. 2, 3 and 4, the pilot bag 42 is designed to enhance and provide sufficient drag for proper parachute 20 deployment. The pilot bag 42 sufficiently increases the surface area around the parachute 20 contained therein, and is generally inflated when pulled through the air. Therefore, when the pilot bag 42 is released into the air stream, it is dragged away from the Jumper or load such that the parachute 20 is efficiently and properly deployed therefrom.

In accordance with the preferred embodiment illustrated in FIG. 4, the pilot bag 42 is somewhat of an inverted conical configuration that tapers towards the pack 12 when dragged therebehind. An umbrella-like upper portion 46 of the pilot bag 42 is made of a pliant sheet-like material, such as nylon fabric or other suitable material, while a tapered lower portion 48 of the pilot bag 42 is preferably constructed of nylon mesh or other suitable material. Thus, the mesh material of the tapered portion 48 allows air to inflate the pilot bag 42 upon release, thereby creating drag. Furthermore, the tapered portion 48 may be constructed in any manner which allows air to inflate the umbrella-like portion 46.

The pilot bag 42 includes an inner bag 50 for stowing the parachute 20 therein, see FIGS. 2, 3 and 4. The inner bag 50 is attached to the pilot bag 42 using stitching or any other suitable attaching means; wherefore, the inner bag 50 is an integral part of the pilot bag 42.

The parachute 20 is stowed and released from the inner bag 50 in the conventional manner used for stowing and releasing parachutes from known "full" type deployment bags. The inner bag 50 comprises an internal containment portion of the pilot bag 42, while an enclosable opening 52 allows the parachute 20 to be released therefrom. The opening 52 is generally located in the tapered portion 48 of the pilot bag 42 and is closed using inner bag flaps 54 and a common locking stow means including a rubber band and grommet. Therefore, as the pilot bag 42 fills with air upon release and is drawn away from the pack 12, the parachute 20 is released from the inner bag 50 for deployment.

Preferably, the inner bag 50 has a pocket 56 attached thereto using stitching and other known means of attachment, see FIGS. 2 and 3. The pocket 56 is attached to the inner bag 50 and is used for stowing and holding the lines 22 adjacent thereto, wherein the lines 22 slide from the pocket 56 as the pilot bag 42 is drawn away from the pack 12.

Furthermore, the inner bag 50 may include a closable seam (not shown) which is parallel to the pocket 56. Hence, the seam allows efficient stowage of the parachute 20 therein, add preferably uses "VELCRO" or other suitable securing means for closure thereof.

As described herein, the preferred version of the deployment system 10 is for use by a Jumper during free fall. When the Jumper wishes to deploy the parachute 20, the handle 26 is decoupled from the pack 12 and pulled therefrom to release the internal rip cord pin 30 from the rip cord 36, thereby opening the pack 12. In a continuing action, the handle 26 is further pulled away from the pack 12 to remove the parachute 20 and pilot bag 42 from the pack 12 and place them in the air stream. The pilot bag 42, which contains the parachute 20 therein, captures air and is dragged away from the pack 12, thereby pulling the lines 22 from the pocket 56. When the lines 22 are extended between the pack 12 and parachute 20, the parachute 20 is pulled from the opening 52 of the inner bag 50 in a manner traditionally used with known deployment bags. After the parachute 20 is open, the inner bag 50 is inverted to substantially enclose the pilot bag 42. Thus, as illustrated in FIGS. 5 and 6, the inverted pilot bag 42 is held adjacent the top central portion of the opened parachute 20 for reducing drag and the risk of entanglement therewith.

A method of using the preferred embodiment of the parachute deployment system 10 includes: providing the pack 12 for stowing the parachute 20 and pilot bag 42, wherein the parachute 20 is attached to the pack 12 via the lines 22; providing an internal rip cord pin 30 in communication with the handle 26; decoupling the handle 26 from the pack 12; opening the pack 12 by using the handle 26 to release the internal rip cord pin 30; using the handle 26 to simultaneously remove the parachute 20 and pilot bag 42 from the pack 12; pulling the parachute 20 and pilot bag 42 away from the pack 12, wherein the parachute 20 and pilot bag 42 are simultaneously pulled away from the pack 12; releasing the lines 22 from the pocket 56; extending the lines 22 between the pack 12 and parachute 20; opening the inner bag 50; pulling the stowed parachute 20 from the inner bag 50; opening the parachute 20; and inverting the pilot bag 42.

The previously described versions of the invention have many advantages, including a simple, economic and safe way of construct a parachute deployment system 10. Another advantage of the present embodiment of the invention is that the deployment system 10 prevents numerous malfunctions during parachute 20 deployment. Yet another advantage of the present embodiment of the invention is to prevent entanglements and reduce drag after the parachute 20 is opened.

The preferred use of the present version of the invention is for personal, direct deployment systems. However, it is obvious 25 that the pilot bag 42 may be used in conjunction with cargo carrying and vehicle deployment systems, wherein the pilot bag 42 and parachute 20 are simultaneously released from the pack 12. While the pilot bag 42 described and shown herein is the preferred mode of assisting means 34; it is obvious that the assisting means 34 includes any means which holds the parachute 20 adjacent therewith and increases drag for enhancing deployment. Additionally, it is obvious that other initiating means 24, such as static line, ejector or automatic systems, may be used to open the pack 12 and to place the parachute 20 and pilot bag 42 into the air stream.

Therefore, the foregoing descriptions of specific embodiments of the present invention have been presented for purposes of illustration and description. They are not intended to be exhaustive or to limit the invention to the precise forms disclosed and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for deploying a parachute, comprising:

a pilot bag having an upper portion and a lower portion;

said lower portion having means for allowing air to inflate said pilot bag;

means for containing the parachute; and wherein said means for containing the parachute is an integral part of said pilot bag and is located within said lower portion thereof.

2. An apparatus as recited in claim 1, wherein:

said means for allowing air to inflate said pilot bag generally surrounds said means for containing the parachute.

3. An apparatus as recited in claim 1, wherein:

said lower portion generally tapers from said upper portion to an opening in said means for containing the parachute, said opening allows the parachute to be received in said means for containing the parachute.

4. An apparatus as recited in claim 1, wherein:

said means for containing the parachute includes an inner bag.

5. An apparatus as recited in claim 4, wherein:

said inner bag has an opening for receiving the parachute therein, said opening is generally located in said lower portion of said pilot bag.

6. An apparatus as recited in claim 4, wherein:

said inner bag has a pocket for holding lines attached to the parachute.

7. An apparatus as recited in claim 6, wherein:

said pocket for holding lines is located within said lower portion of said pilot bag.

8. An apparatus as recited in claim 1, wherein:

said means for allowing air to inflate said pilot bag includes a sheet-like material having a plurality of apertures.

9. An apparatus as recited in claim 1, further comprising:

a handle for manually pulling said pilot bag from a pack; and means for attaching said handle to said pilot bag.

10. An apparatus as recited in claim 1, further comprising:

a pack for stowing said pilot bag and parachute therein;

means for opening said pack wherein said means for opening includes a rip cord pin; and wherein said rip cord pin is located inside said pack when said pilot bag and parachute are stowed therein.

11. An apparatus for deploying a parachute, comprising: a pilot bag having means for containing the parachute; means for allowing air to inflate the pilot bag; a handle for manually pulling said pilot bag from a pack; and means for attaching said handle to said pilot bag; wherein said means for containing the parachute is located within said pilot bag.

12. An apparatus as recited in claim 11, wherein:

said means for containing the parachute is an integral part of said pilot bag and is located within a lower portion thereof.

13. An apparatus as recited in claim 11, wherein:

said means for containing the parachute includes an inner bag located within a lower portion of said pilot bag; and said inner bag has a pocket for holding lines attached to the parachute.

14. An apparatus as recited in claim 11, further comprising:

a pack for stowing said pilot bag and parachute therein;

means for opening said pack wherein said means for opening includes a rip cord pin; and wherein said rip cord pin is located inside said pack when said pilot bag and parachute are stowed therein.

15. An apparatus as recited in claim 14, wherein:

said means for opening includes means for attaching said handle to said rip cord pin.

16. A method for deploying a parachute, comprising the step of:

providing a pilot bag having an upper portion and a lower portion;

wherein said lower portion includes means for allowing air to inflate said pilot bag;

wherein said pilot bag includes means for containing the parachute; and wherein said means for containing the parachute is an integral part of said pilot bag and is located within said lower portion thereof.

17. The method as recited in claim 16, further comprising the steps of:

providing a pack wherein the pilot bag and parachute are stowed in the pack;

providing a handle attached to the pilot bag;

opening the pack; and using the handle to manually pull the pilot bag from the pack.

18. An apparatus for deploying a parachute, comprising:

a pilot bag having means for containing the parachute;

a pack for stowing said pilot bag;

means for opening said pack to release said pilot bag, wherein said means for opening includes a rip cord pin which is located inside said pack when the parachute is stowed therein;

wherein said pilot bag has an upper portion and a lower portion; said lower portion having means for allowing air to inflate said pilot bag; and wherein said means for containing the parachute is an integral part of said pilot bag and is located within said lower portion thereof.

\* \* \* \* \*